United States Patent
Takenoshita et al.

(10) Patent No.: US 7,690,594 B2
(45) Date of Patent: Apr. 6, 2010

(54) RECORDING TAPE CARTRIDGE

(75) Inventors: Kenji Takenoshita, Odawara (JP);
Kiyoo Morita, Odawara (JP); Kazuo Hiraguchi, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 44 days.

(21) Appl. No.: 12/031,829

(22) Filed: Feb. 15, 2008

(65) Prior Publication Data

US 2008/0197225 A1    Aug. 21, 2008

(30) Foreign Application Priority Data

Feb. 20, 2007    (JP) .............................. 2007-039700

(51) Int. Cl.
*G11B 15/66* (2006.01)

(52) U.S. Cl. .................. 242/332.4; 242/348.2; 360/132

(58) Field of Classification Search ................. 242/248, 242/248.2, 348.3, 332.4, 532.1, 532.6; 360/132
See application file for complete search history.

(56) References Cited

U.S. PATENT DOCUMENTS

| 6,236,539 | B1 * | 5/2001 | Morita et al. ............... 360/132 |
| 6,331,922 | B2 * | 12/2001 | Morita et al. ............... 360/132 |
| 6,349,016 | B1 * | 2/2002 | Morita et al. ............... 360/132 |
| 6,874,721 | B2 * | 4/2005 | Aaron et al. ............. 242/348.2 |
| 6,926,219 | B2 * | 8/2005 | Imai ........................ 242/332.4 |
| 7,121,494 | B2 * | 10/2006 | Shiga et al. ............... 242/348.2 |
| 7,520,462 | B2 * | 4/2009 | Takenoshita et al. ...... 242/348.2 |
| 2003/0122016 | A1 * | 7/2003 | Imai ........................ 242/348.2 |
| 2004/0041051 | A1 * | 3/2004 | Ishihara ................... 242/348.2 |
| 2005/0139709 | A1 * | 6/2005 | Shiga et al. ............... 242/348.2 |
| 2005/0236505 | A1 * | 10/2005 | Tsuchiya .................. 242/332.4 |
| 2006/0186246 | A1 * | 8/2006 | Hiraguchi ................. 242/348.2 |
| 2009/0084881 | A1 * | 4/2009 | Hiraguchi et al. ......... 242/348.2 |

FOREIGN PATENT DOCUMENTS

| JP | 11-250619 A | 9/1999 |
| JP | 2001-148179 A | 5/2001 |
| JP | 2003-242741 A | 8/2003 |
| JP | 3989622 B2 | 7/2007 |

* cited by examiner

*Primary Examiner*—Evan H Langdon
(74) *Attorney, Agent, or Firm*—Sughrue Mion, PLLC

(57) ABSTRACT

A recording tape cartridge is provided that includes a leader pin attached, directly or through a leader tape, to an end portion of a recording tape, and includes flange portions formed at both ends thereof, an opening formed at a case, and from which the leader pin is pulled out; holding portions formed at an upper case and a lower case respectively, and holding respectively the flange portions of the leader pin in the vicinity of the opening; an overhang portion formed at at least one of the holding portions, and overlaping with the flange portion at an inner surface side thereof when the leader pin is held at the holding portions; and an elastic deformable engaging portion formed at at least one of the holding portions to urge the flange portion in an axial direction of the leader pin when the leader pin is held at the holding portions.

9 Claims, 9 Drawing Sheets

RECORDING TAPE CARTRIDGE

CROSS-REFERENCE TO RELATED APPLICATION

This application claims priority under 35 USC 119 from Japanese Patent Application No. 2007-039700, the disclosure of which is incorporated by reference herein.

BACKGROUND OF THE INVENTION

1. Field of the Invention

The present invention relates to a recording tape cartridge including a case for accommodating therein a single piece of a reel wound by a recording tape such as a magnetic tape that is mainly used as a recording reproduction medium in a computer or the like.

2. Description of the Related Art

Conventionally, a recording tape cartridge has been already known in which a recording tape such as a magnetic tape that is used as a data recording reproduction medium in a computer or the like is wound around a reel, and a single piece of the reel is accommodated in a case that is formed by an upper case and a lower case. To the leading end of the recording tape is secured a leader member that is pulled out by a pullout member of a driving apparatus. An example of the leader member includes a leader pin. The leader pin is formed in a substantially dumbbell shape, has flange portions at both ends of a main body portion of the leader pin, to which the recording tape is secured directly or through a leader tape.

The flange portions of the leader pin are accommodated into concaved holding portions that are formed at an upper case and a lower case near an opening of the case. The leader pin is held, with the height direction of the case being as an axial direction, by the flange portions being pressed by springs or the like. Therefore, when an impact due to a fall or the like is applied to the vicinity of the opening of the case, and the upper case and the lower case are flexed and deformed, separating away from each other (conducting a so-called "deformation of the opening of the case"), it is feared that the flange portions are off-positioned from the holding portions, and the leader pin is inclined and/or removed from the holding portions.

When such a phenomenon occurs, the pullout member of the driving apparatus may unsuccessfully chuck with the leader pin, resulting in a system error. Accordingly, a recording tape cartridge has conventionally been proposed in which the removal of the flange portions from the holding portions can be prevented by forming at the holding portions under-cut grooves with which the flange portions of the leader pin are engaged, i.e., concaved grooves into which the flange portions are entered (see Japanese Patent Application Laid-Open (JP-A) No. 2001-148179, for example).

However, in such a recording tape cartridge, an urging member such as a spring, which presses the flange portions of the leader pin, is provided, thus there is a problem of increasing cost of manufacturing and assembling of the urging member. Further, a recording tape cartridge is proposed in which an outer surface of the flange portion is urged by an urging member such as a spring to press the leader pin in an axial direction (see Japanese Patent Application Laid-Open (JP-A) No. 11-250619, for example). The same problem applies in this case. Further, with such a structure, the aforementioned deformation of the opening of the case cannot be prevented at the time when an impact is applied to the vicinity of the opening due to a fall or the like thereby causing a problem that the flange portions of the leader pin may be off-positioned from the holding portions.

A recording tape cartridge has conventionally been proposed that engaging portions having spring characteristics are formed integrally with an upper case and a lower case, and by pressing with the engaging portions, a leader block is pressed in a height direction of the case (see Japanese Patent Application Laid-Open (JP-A) No. 2003-242741). However, in the leader block, it is difficult to apply a structure that undercut grooves (concaved grooves) are formed and pressing is performed. Accordingly, also in the case of this recording tape cartridge, when an impact is applied to the vicinity of the opening due to a fall or the like, the aforementioned deformation of the opening of the case cannot be prevented, and a problem is caused that the leader block may be off-positioned from the holding portion.

SUMMARY OF THE INVENTION

In view of the aforementioned facts, the present invention provides a recording tape cartridge that can prevent removal of a leader pin from holding portions when the recording tape cartridge is out of use, and in which manufacturing cost can be reduced.

A first aspect of the invention is a recording tape cartridge, including: a case that includes an upper case and a lower case, and in which a single reel on which a recording tape is wound is accommodated; a leader pin that is attached, directly or through a leader tape, to an end portion of the recording tape, and includes flange portions formed at both ends thereof, an opening that is formed at the case, and from which the leader pin is pulled out; holding portions that are formed at the upper case and the lower case respectively, and hold respectively the flange portions of the leader pin in the vicinity of the opening; an overhang portion that is formed at at least one of the holding portions, and overlaps with the flange portion at an inner surface side thereof when the leader pin is held at the holding portions; and an elastic deformable engaging portion that is formed at at least one of the holding portions to urge the flange portion in an axial direction of the leader pin when the leader pin is held at the holding portions.

In accordance with the first aspect of the invention, even when an impact is applied to the vicinity of the opening of the case due to a fall or the like, and the upper case and the lower case are flexed and deformed, separating away from each other (conducting a so-called "deformation of the opening of the case"), the flange portions of the leader pin can be pressed and held by the overhang portions, and a fear does not occur that the leader pin may be inclined or removed from the holding portions. Further, the leader pin is urged in an axial direction by the engaging portion that is formed so as to be elastically deformable at the holding portion and held thereat. Therefore, the provision of urging member such as a spring that has conventionally been provided becomes unnecessary. Accordingly, the manufacturing of the recording tape cartridge can be reduced.

Further, a second aspect of the present invention is the recording tape cartridge according to the first aspect of the invention, a protrusion is formed at an inner surface of the engaging portion at a side of the opening with respect to the flange portion when the leader pin is held at the holding portions.

In accordance with the second aspect of the present invention, since the protrusion is formed at the inner surface of the engaging portion at the side of the opening with respect to the flange portion when the leader pin is held at the holding portions, the removal of the leader pin from the holding portions can further be prevented when the recording tape cartridge is out of use.

Further, a third aspect of the present invention is the recording tape cartridge according to the first aspect of the invention, a slit portion having a predetermined depth is formed at an inner surface of the engaging portion.

Further, a fourth aspect of the present invention is the recording tape cartridge according to the third aspect of the invention, the engaging portion is elastically deformable such that the engaging portion is rotatable about the slit portion as a center in substantially the axial direction of the leader pin.

Further, a fifth aspect of the present invention is the recording tape cartridge according to the first aspect of the invention, a protrusion is formed at an inner surface of the engaging portion at a side of the opening with respect to the flange portion when the leader pin is held at the holding portions, and a slit portion having a predetermined depth is formed at the inner surface of the engaging portion at a side of the opening with respect to the protrusion.

Further, a sixth aspect of the present invention is the recording tape cartridge according to the first aspect of the invention, a convex and curved surface is formed at the flange portion at an outer surface side thereof, and a concave and curved surface is formed at the engaging portion at an inner surface side thereof.

Further, a seventh aspect of the present invention is the recording tape cartridge according to the sixth aspect of the invention, curvature of the convex and curved surface of the flange portion is the same as that of the concave and curved surface of the engaging portion.

Further, an eighth aspect of the present invention is the recording tape cartridge according to the first aspect of the invention including a plurality of the overhang portions and the engaging portions, wherein the overhang portions and the engaging portions are formed respectively at the holding portions.

As described above, the present invention can provide the recording tape cartridge that can prevent the removal of the leader pin from the holding portions when the recording tape cartridge is out of use and in which manufacturing cost can be reduced.

BRIEF DESCRIPTION OF THE DRAWINGS

Embodiments of the invention will be described in detail with reference to the following figures, wherein.

DETAILED DESCRIPTION OF THE INVENTION

Figure 1:
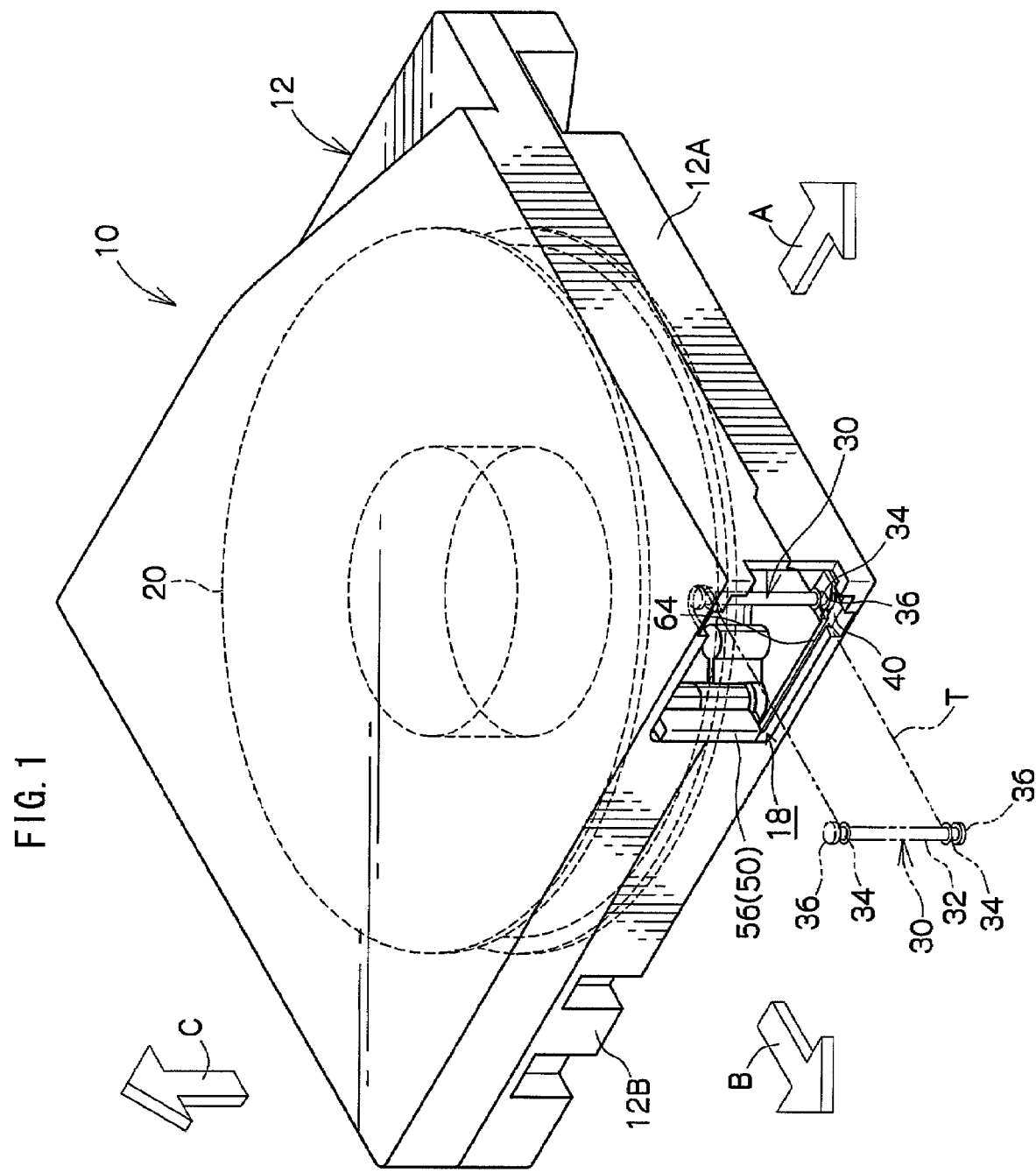
FIG. 1 is a schematic perspective view of a recording tape cartridge.

Hereinafter, the preferred exemplary embodiment for carrying out the invention will be explained in detail based on embodiments shown in the drawings. Further, for convenience' sake to explain the embodiments of the present invention, FIG. 1 shows arrow A indicating a loading direction in which a recording tape cartridge 10 is loaded onto a driving apparatus and which corresponds to a forward direction (a front side) of the recording tape cartridge 10. Direction of arrow B orthogonal to arrow A corresponds to a right direction (a right side), direction of arrow C corresponds to an upper direction (an upper side) of the recording tape cartridge 10. Direction represented by the direction of arrow C and a direction opposite to the direction of arrow C is referred to as an "axial direction" of a reel 20 and a leader pin 30, running in the same direction as a "height direction".

Figure 2:
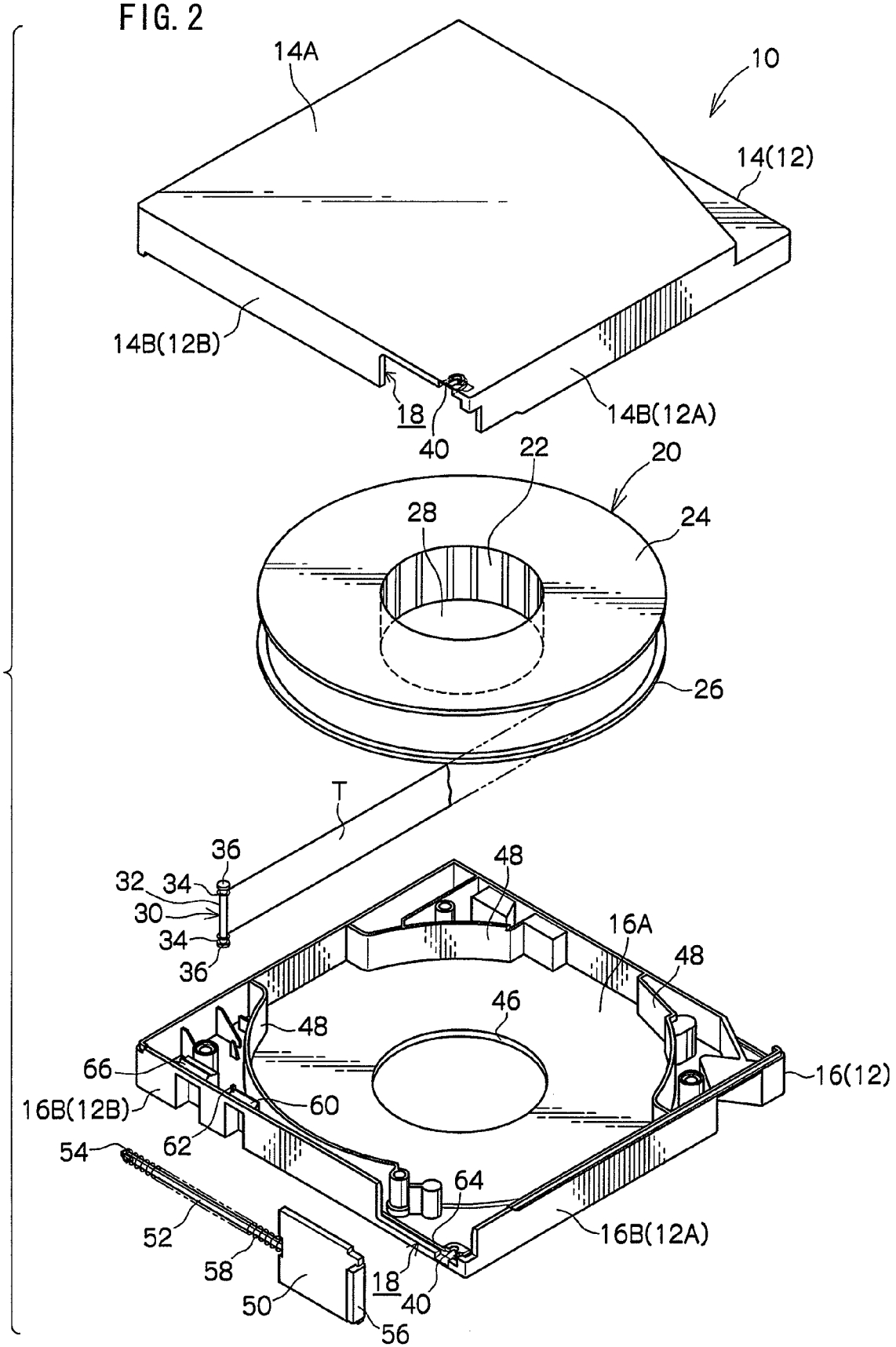
FIG. 2 is a schematic exploded perspective view of the recording tape cartridge.

As illustrated in FIGS. 1 and 2, the recording tape cartridge 10 includes a substantially rectangular-shaped case 12. The case 12 is formed by connecting an upper case 14 at which a peripheral wall 14B is formed to protrude uprightly from a peripheral edge of a top plate 14A and a lower case 16 at which a peripheral wall 16B is formed to protrude uprightly from a peripheral edge of a bottom plate 16A, and both of which are made of a synthetic resin such as a polycarbonate (PC), to each other by means of ultrasonic welding, screwing or the like in a state in which the peripheral wall 14B and the peripheral wall 16B are abut to each other.

A single piece of the reel 20 is rotatably accommodated in the case 12. In the reel 20, a cylindrical-shaped reel hub 22 having a bottom portion for constituting an axial center portion of the reel 20 and a lower flange 26 disposed at a lower end portion of the reel hub 22 are formed integrally with each other. An upper flange 24 is connected to an upper end portion of the reel hub 22 by means of an ultrasonic welding. A recording tape T such as a magnetic tape as an information recording reproduction medium is wound around an outer circumference surface of the reel hub 22, and widthwise ends of the recording tape T wound around the outer circumference surface of the reel hub 22 is held by the upper flange 24 and the lower flange 26.

Further, an annular reel gear (not shown in the drawings) is formed at a bottom surface of a bottom wall 28 of the reel hub 22, and a gear opening 46 is punched at a central portion of the lower case 16 to expose the reel gear to the exterior of the case 12. The reel gear that is exposed from the gear opening 46 is meshed with a driving gear (not shown in the drawings) that is formed at a rotation shaft (not shown in the drawings) in the driving apparatus (not shown in the drawings), and is driven and rotated, whereby the reel 20 can rotate with respect to the case 12 relatively with each other.

An annular reel plate (not shown in the drawings) formed of a magnetic material is secured by insert molding or the like, to a portion at an inner side in a radial direction of the reel gear at the bottom surface of the bottom wall 28, and is adsorbed and held by a magnetic force of an annular magnet (not shown in the drawings) that is provided at the rotation shaft of the driving apparatus. Further, the reel 20 is held by play control (restrict) walls 48 without being rattled, the play control walls 48 being provided partially to protrude respectively from the inner surfaces of the upper case 14 and the lower case 16 and serving as inner walls that are existent on a circular locus that is drawn to be coaxial with the gear opening 46.

An opening 18, from which the recording tape T that is wound around the reel 20 is pulled out, is formed at a right wall 12B of the case 12. A leader pin 30, which is operated to be pulled out while being anchored to (or engaged with) a pullout member (not shown in the drawings) of the driving apparatus, is secured directly or through the leader tape (not shown in the drawings) to a free end portion of the recording tape T that is pulled out from the opening 18.

Figure 3:
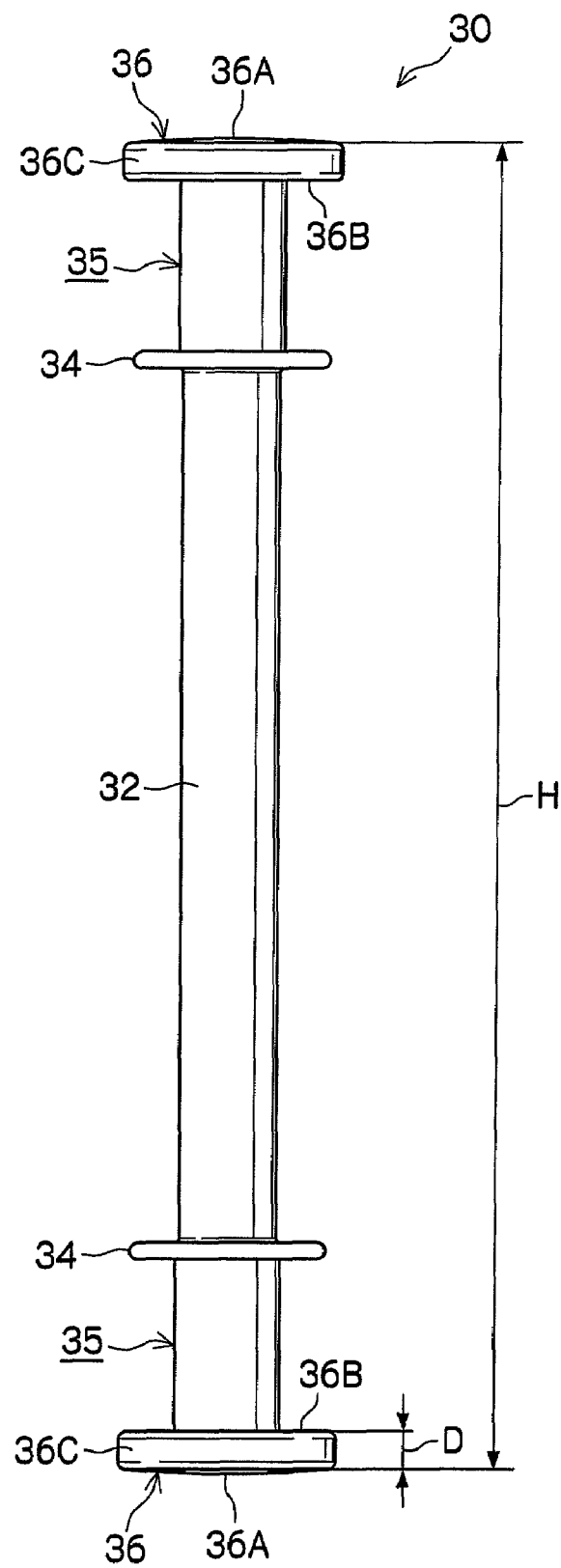
FIG. 3 is a schematic front view of a leader pin.

As shown in FIG. 3 in more detail, the leader pin 30 includes a cylindrical main body portion 32, and disc-shaped flange portions 36 which are formed integrally with the main body portion 32 at both ends of the main body portion 32 and each of which has a diameter that is larger than that of the main body portion 32. Small flange portions 34 are also formed integrally with the main body portion 32 to restrict an area to which the recording tape T is attached. Each of the small flange portions 34 is formed to have a diameter that is larger than that of the main body portion 32 and that is equal to or smaller than that of each of the flange portions 36.

The small flange portion 34 is formed in a smaller thickness than that of the flange portion 36. An annular groove 35 which engages with a hook or the like (not shown in the drawings) of the pullout member of the driving apparatus is each formed between the small flange portion 34 and the flange portion 36. Providing of the small flange portions 34 can help prevent the hooks or the like from being brought into contact with the recording tape T thereby causing the recording tape T to be damaged when the recording tape T is pulled out. Further, an outer surface 36A of the flange portion 36 forms a convex curved surface having a small curvature.

Figure 4:
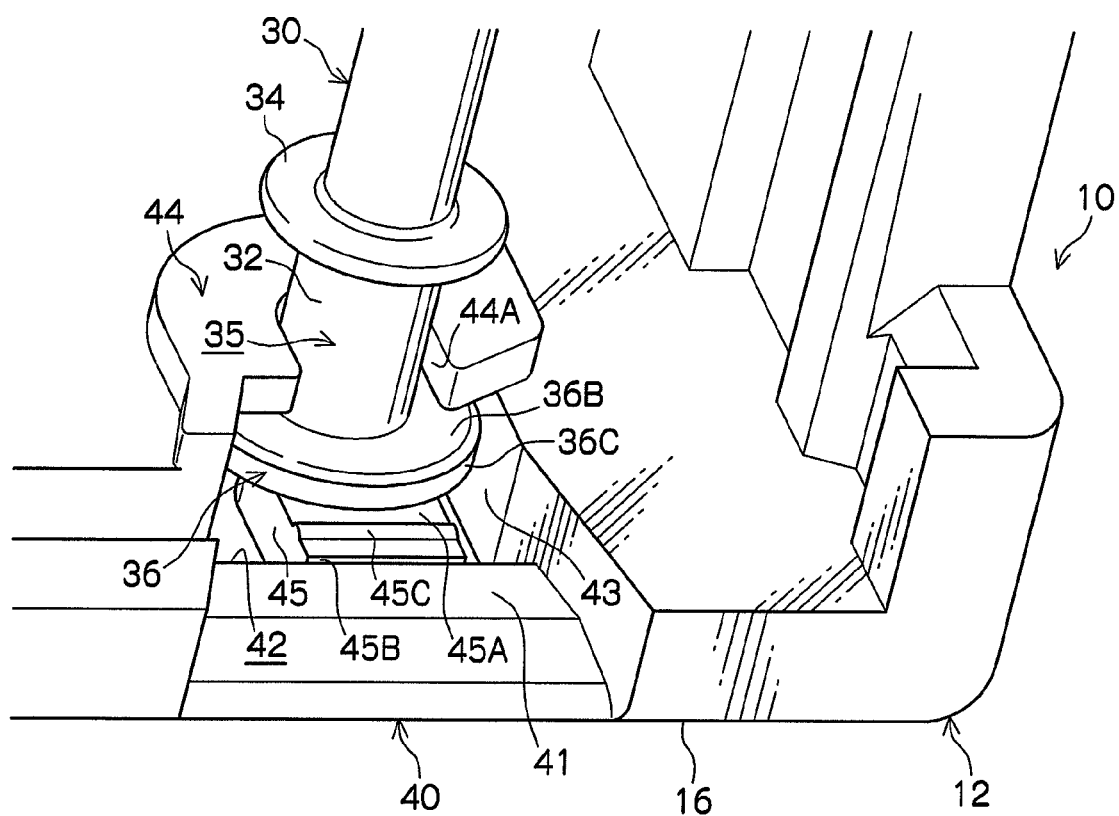
FIG. 4 is a schematic perspective view of one holding portion.

An upper and lower pair of holding portions 40 is provided at the inside of the opening 18 of the case 12, in other words, at the inner surface of the top plate 14A of the upper case 14 and at the inner surface of the bottom plate 16A of the lower case 16, respectively. The holding portions 40 position and hold the leader pin 30 within the case 12. As shown in FIG. 4, the holding portions 40 are formed at the inner surface of the top plate 14A and at the inner surface of the bottom plate 16A and each has a concave portion 41 that is opened at the side at which the recording tape T is pulled out. The flange portions 36 of the leader pin 30 in an upright state can enter to/exit from the concave portions 41 at the opening side. Further, the structure of the holding portions 40 will be described later.

The opening 18 is opened/closed by a door 50. The door 50 is formed into a substantially rectangular plate shape having a size that is able to close the opening 18. In order to make the door 50 movable along the right wall 12B of the case 12, groove portions 64 are formed at the top plate 14A and at the bottom plate 16A at an inner side of the opening 18 to allow the upper and lower end portions of the door 50 to be fitted into the groove portions 64 so as to be able to be slidable.

Further, a shaft 52 is provided to protrude from a rear end central portion of the door 50. A coil spring 58 is fitted by insertion onto the shaft 52. Further, an expanding portion 54 is formed at a rear end of the shaft 52 to prevent falling of the coil spring 58 from the shaft 52. Moreover, a supporting mount 60, having an engaging portion 62 for engaging the rear end of the coil spring 58 that is fitted by insertion onto the shaft 52, is formed at the lower case 16 so as to protrude therefrom.

The door 50 is always urged in a direction in which the opening 18 is closed, due to an urging force of the coil spring 58, by the shaft 52 being freely slidably supported by the supporting mount 60, and by the rear end of the coil spring 58 being anchored to the engaging portion 62. Further, it is preferable to further provide in protruding manner a supporting mount 66 for supporting the shaft 52 when the opening 18 is opened at the rear side of the supporting mount 60.

A convex portion 56 for opening/closing operation is provided at a front-end side of the door 50 to protrude outwardly from the case 12. In accordance with the loading of the recording tape cartridge 10 onto the driving apparatus, the convex portion 56 is engaged with an opening/closing member (not shown in the drawings) provided at the driving apparatus. Accordingly, the door 50 is opened against the urging force applied from the coil spring 58.

Next, a more detailed description of the structure of the holding portions 40 will be made. Since the upper and lower holding portions 40 are structured in the same manner, the holding portion 40 that is shown in FIG. 4 and provided at the lower case 16 side will be mainly explained. As shown in FIG. 4, the holding portion 40 has the concave portion 41 whose side at which the recording tape T is pulled out is opened. An overhang portion 44 is formed (overhung) at a position that is separated in a height direction at a predetermined interval from an engaging portion 45 (that will be described later) that is formed at the concave portion 41. The overhang portion 44 overlaps with an inner surface 36B side of the flange portion 36 with a predetermined amount, without being contacted with the inner surface 36B, when the leader pin 30 (the flange portion 36) is held at the holding portion 40 (the engaging portion 45).

Figure 6A:
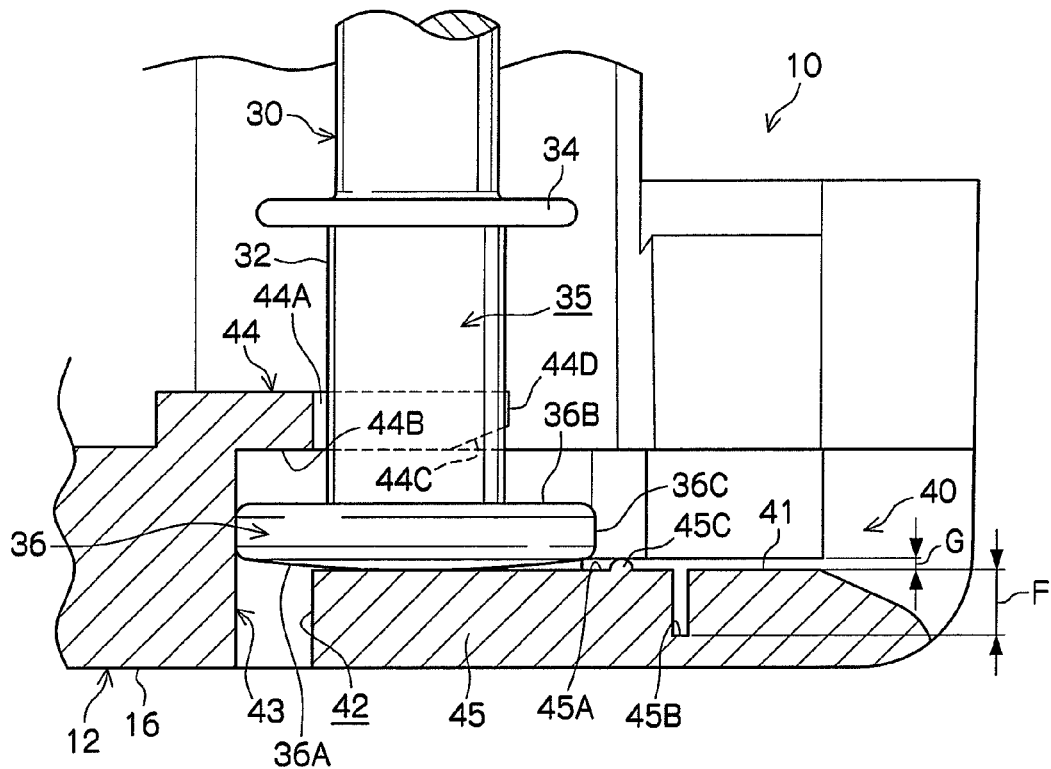
FIG. 6A is a schematic cross-sectional side view of one holding portion when the leader pin is held.
Figure 7A:
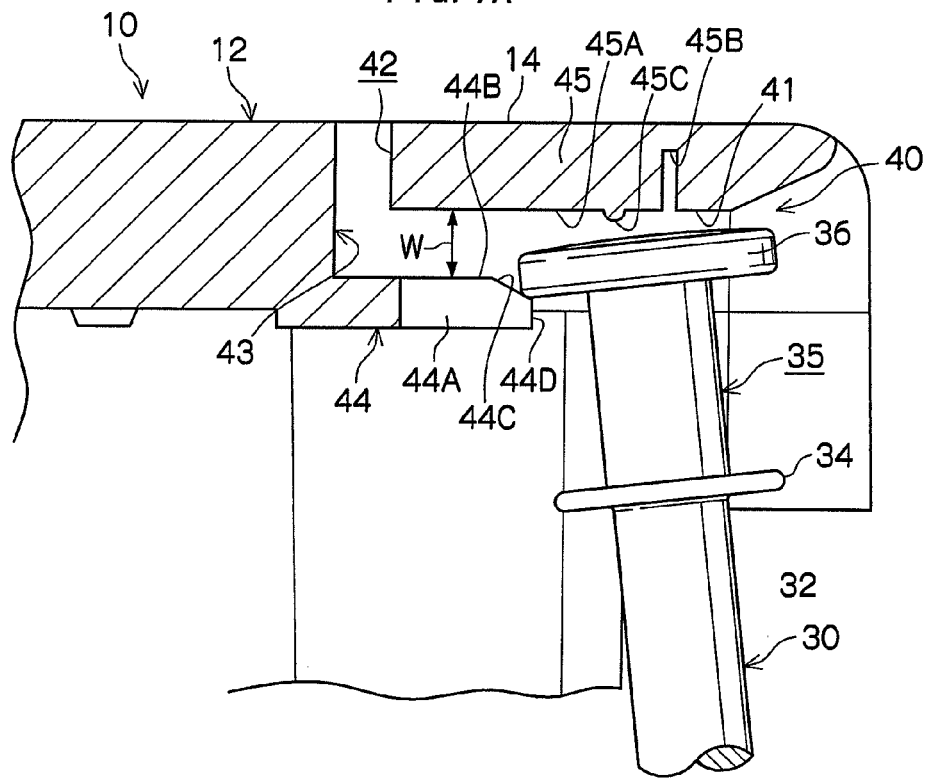
FIG. 7A is a schematic cross-sectional side view showing a state in which the leader pin is inclined and returned to the holding portion.
Figure 7B:
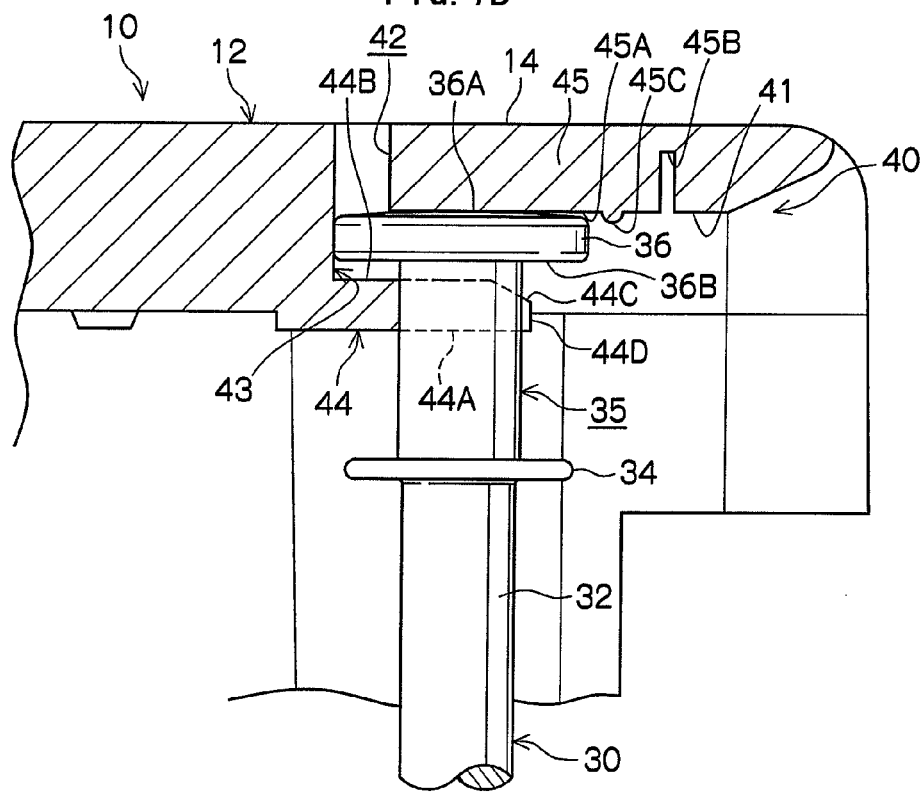
FIG. 7B is a schematic cross-sectional side view showing a state in which the leader pin is held at the holding portion.

In other words, a gap W (see FIG. 7) between the engaging portion 45 and the overhang portion 44 is formed to have a dimension that is larger than a thickness D of the flange portion 36 (see FIG. 3), and a predetermined clearance is formed between the inner surface 36B of the flange portion 36 held by the engaging portion 45 and an outer surface 44B of the overhang portion 44 (see FIGS. 6A and 7B). Further, as shown in FIG. 4, a substantially U-shaped notch portion 44A as seen from a plan view is formed, at a substantially central portion of the overhang portion 44 at the side at which the recording tape T is pulled out, to accommodate therein a portion of the main body portion 32 corresponding to the annular groove 35 portion.

Figure 5A:
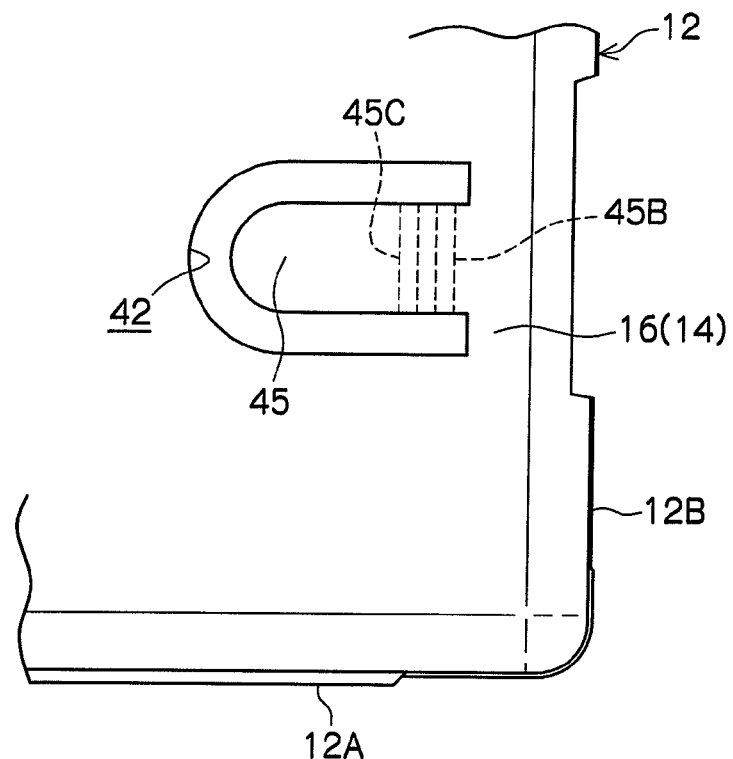
FIG. 5A is a schematic perspective bottom view of a through hole when the leader pin is not held by the holding portion.

The overhang portions 44 are formed (molded) integrally with the upper case 14 and the lower case 16. In order to prevent the release of the overhang portion 44 being impossible from the unillustrated die (mold) (to prevent formation of a so-called "undercut portion") after the overhang portion 44 has been formed, the overhang portions 44 are formed (molded) by such that, as shown in FIG. 5A, a substantially U-shaped through hole 42 as seen from a plan view or a bottom view, whose configuration substantially coincidence with that of the overhang portion 44, is each formed at the upper case 14 and the lower case 16.

Due to the through holes 42 being thus formed, substantially tongue-shaped engaging portions 45 are formed respectively at the top plate 14A and at the bottom plate 16A within the concave portions 41, which hold the outer surfaces 36A of the flange portions 36 in the axial direction of the leader pin 30. In other words, a gap between one protrusion 45C formed at the holding portion 40 (at the concave portion 41) of the upper case 14 and the other protrusion 45C formed at the holding portion 40 (at the concave portion 41) of the lower case 16 is formed slightly smaller than the total height H (see FIG. 3) of the leader pin 30.

As shown in FIGS. 4, 6A, 6B, 7A and 7B, a slit (groove) portion 45B having a predetermined depth F and the protrusion 45C having a predetermined height G are formed at an inner surface 45A of the engaging portion 45 in this order from the opening 18 side. The slit portion 45B and the protrusion 45C are formed over the total width of the engaging portion 45 in the direction of arrow A (in parallel to the right wall 12B). The slit portion 45B allows the engaging portion 45 to be elastically deformable (flexed) in a substantially axial direction of the leader pin 30, i.e., a direction in which the engaging portion 45 rotates in a height direction with the slit portion 45B as a center as seen from a cross-sectional side view of FIG. 6B.

Figure 6B:
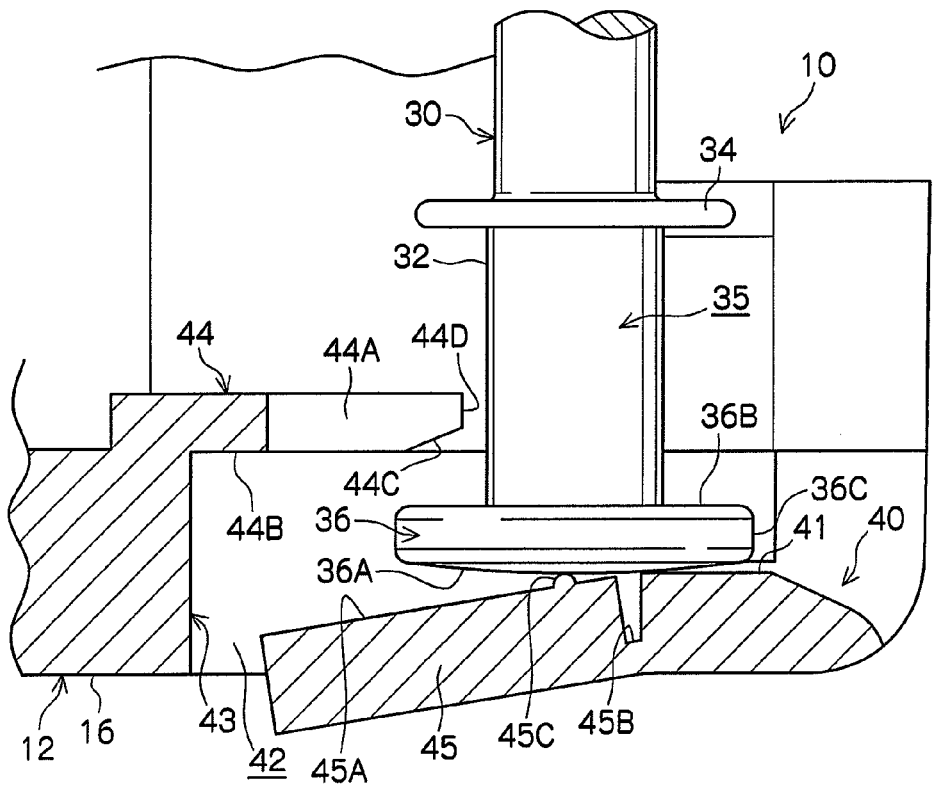
FIG. 6B is a schematic cross-sectional side view of the holding portion when the leader pin is detached or attached.

When the leader pin 30 enters to or exits from the holding portion 40 (within the concave portion 41), as shown in FIG. 6B, the outer surface 36A of the flange portion 36 passes over (rides and passes) the protrusion 45C, and enters to or exits from the holding portion 40. At this time, the engaging portion 45 that is formed within the concave portion 41 is flexed (elastically deformed) due to the slit portion 45B toward the external side to thereby allow the flange portion 36 to pass over the protrusion 45C.

The flange portions 36, that have passed over the protrusions 45C and have already been accommodated into the holding portions 40 (within the concave portions 41), of the leader pin 30 are subjected to urging forces applied in the axial direction of the leader pin 30 from the upper and lower pair of the engaging portions 45 (one flange portion 36 is urged downwardly by the engaging portion 45 at the upper case 14 side and the other flange portion 36 is urged upwardly by the engaging portion 45 at the lower case 16 side), and held so as to prevent the removal of the leader pin 30 from the holding portions.

As shown in FIGS. 4, 6A, 6B, 7A and 7B, a substantially U-shaped inner wall surface 43 as seen from a plan view, to which the outer circumference surface 36C of the flange portion 36 faces (abuts), is formed around the concave portion 41 at the inner surface of the top plate 14A of the upper case 14 and at the inner surface of the bottom plate 16A of the lower case 16, and around the through hole 42. The overhang portion 44 is provided integrally with the inner wall surface 43 so as to extend from the height direction tip end of the inner wall surface 43 toward the side at which the recording tape T is pulled out.

Figure 5B:
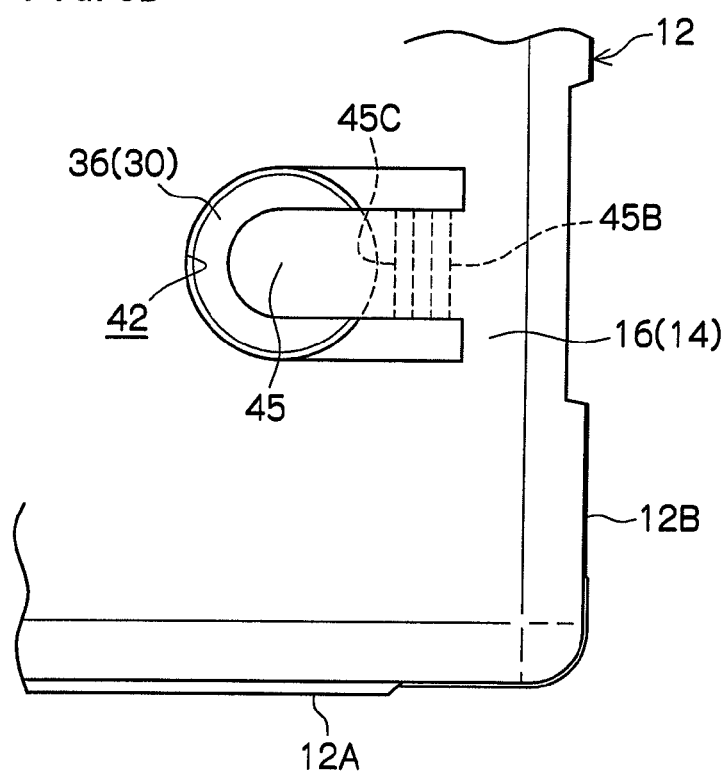
FIG. 5B is a schematic perspective bottom view of a through hole when the leader pin is held by the holding portion.

As shown in FIG. 5B, the through hole 42 may be closed to some degree by the flange portion 36 of the leader pin 30 when the recording tape cartridge 10 is out of use, i.e., when it is not loaded onto the driving apparatus. However, the through hole 42 may be closed by pasting a closing member such as a seal or the like (not shown in the drawings) to the respective outer surfaces of the top plate 14A of the upper case 14 and the bottom plate 16A of the lower case 16. Accordingly, even if the case 12 is provided with the through holes 42, the inside of the case 12 may have excellent dust proof.

As shown in FIGS. 7A and 7B, a taper surface 44C having a predetermined angle is formed by a chamfering process or a fillet process (R process) on a peripheral surface, at the notch portion 44A side and at the side at which the flange portion 36 is inserted, of the overhang portion 44. By this, even when the leader pin 30 is put back to the holding portion 40 in a state of the leader pin 30 being inclined (see FIG. 7A), the flange portion 36 can be accommodated without interfering with (stacking on) the overhang portion 44 (see FIG. 7B).

Accordingly, in spite of the existence of the overhang portions 44, the leader pin 30 can be detachable therefrom in a stable manner. Further, it is desirable to provide (not to remove) a linear portion 44D on the peripheral surface at the notch portion 44A side of the overhang portion 44. By the linear portion 44D being provided, the strength of the overhang portion 44 can be maintained (it is possible not to loss of the strength of the overhang portion 44).

Next, a description of an operation of the recording tape cartridge 10 having such a structure as described above will be made.

In the recording tape cartridge 10 that is structured as described above, the opening 18 is closed by the door 50 when it is out of use (during its storage or transportation or the like, i.e., when it is not loaded onto the driving apparatus). At that time, the recording tape T is wound around the reel hub 22 of the reel 20.

When the recording tape T is used, with a front wall 12A as a head, the recording tape cartridge 10 is loaded into the driving apparatus along the direction of arrow A. Thus, first, the opening/closing member that is provided at the driving apparatus side engages with the convex portion 56 of the door 50. Then, in this state, as the recording tape cartridge 10 is further moved in the direction of arrow A, the opening/closing member moves the convex portion 56 rearward relatively in resisting to the urging force from the coil spring 58. Then, the door 50 having the convex portion 56 protruded therefrom is slid along the right wall 12B to the rearward in the groove portion 64 to open the opening 18.

In this way, the recording tape cartridge 10 is loaded into the driving apparatus by a predetermined depth. When the opening 18 is fully opened, the recording tape cartridge 10 is descended by a predetermined height, and a positioning member (not shown in the drawings) of the driving apparatus is inserted into a hole for positioning (not shown in the drawings), that is formed at the lower case 16. Accordingly, the recording tape cartridge 10 is accurately positioned at a predetermined position in the driving apparatus to restrict further sliding (rearward movement) of the door 50.

Due to the descending movement of the recording tape cartridge 10, a rotational shaft is entered into the gear opening 46 to mesh the driving gear with the reel gear, relatively with one another. Then, in a state in which the driving gear is completely meshed with the reel gear each other, the reel plate is adsorbed and held by the magnetic force of the annular magnet provided at the inside of the driving gear, whereby the reel 20 can rotate within the case 12 relatively while maintaining the meshing of the reel gear with the driving gear.

On the other hand, from the opening 18 that is opened, the pullout member provided at the driving apparatus is entered into the case 12 to grab the leader pin 30 that is positioned and held at the holding portions 40, and pull it out. Note, at this time, since the recording tape cartridge 10 is accurately positioned at the inside of the driving apparatus, the pullout member can reliably engage the hook with the annular groove 35 of the leader pin 30. Further, in accordance with the movement of the leader pin 30 (the removed (pulled) out behavior of the leader pin 30 from the holding portions 40), the outer surface 36A of the flange portion 36 passes over the protrusion 45C. However, at this time, the engaging portion 45 is flexed outwardly due to the slit portion 45B to allow the flange portion 36 to pass over the protrusion 45C.

Thus, the leader pin 30 that is removed out from the opening 18 is accommodated into a take-up reel (not shown in the drawings). Then, the take-up reel and the reel 20 are rotated and driven with being synchronized with each other, whereby the recording tape T is sequentially pulled out from the case 12 while being taken up by the take-up reel, and information can be recorded or reproduced by a recording reproduction head (not shown in the drawings) that is disposed along a predetermined tape path.

When the recording tape cartridge 10 in which information recording or information reproduction has been completed is ejected from the driving apparatus, first, by an inverse rotation of the rotation shaft, the recording tape T is rewound onto the reel 20. Then, when the recording tape T is fully rewound onto the reel 20, the leader pin 30 is held at the holding portions 40.

Also, at this time, the flange portion 36 passes over the protrusion 45C. However, the engaging portion 45 is flexed outwardly due to the slit portion 45B to allow the flange portion 36 to pass over the protrusion 45C. In other words, the leader pin 30 is allowed to be accommodated into the holding portion 40. Accordingly, a predetermined amount of the overhang portion 44 as seen from the plan view overlaps with respect to the flange portion 36 at the inner surface 36B side thereof.

Thereafter, by a predetermined height, the recording tape cartridge 10 is risen, the positioning member is removed from the hole portion for positioning, and the rotation shaft is removed from the gear opening 46, whereby the meshing state of the driving gear with the reel gear is released. Then, by an unillustrated ejecting mechanism, the recording tape cartridge 10 is moved in a direction opposite to the direction of arrow A. Therefore, in accordance with this movement, the urging force is applied to the door 50 from the coil spring 58, and the door 50 is slid in a direction in which the opening 18 is closed to fully close the opening 18 (returned to an initial state). In this way, the recording tape cartridge 10 in which the opening 18 is closed is fully ejected from the driving apparatus.

Further, an operation of the holding portions 40 will be explained.

As shown in FIGS. 6A and 7A, the leader pin 30 is held at the holding portions 40 in a state in which the flange portions 36 that are provided both at the upper end portion and the lower end portion of the main body portion 32 are entered into between the inner surface of the top plate 14A of the upper case 14 and the overhang portion 44 and between the inner surface of the bottom plate 16A of the lower case 16 and the overhang portion 44. Therefore, even when the vicinity of the opening 18 is subject to an impact due to a fall or the like, and is likely to flex-deform so as to be deform-opened (so as to separate the upper case 14 and the lower case 16 away from each other), the flexing-deforming of the opening 18 can be suppressed by the leader pin 30.

In other words, when the vicinity of the opening 18 is caused to flex-deform so as to be deform-opened, since a portion of the overhang portion 44 at the outer surface 44B side can be pressed into contact with a portion of the flange portion 36 of the leader pin 30 at the inner surface 36B side, the deformation of the opening of the case can be suppressed by the leader pin 30. Further, due to this, since the flange portion 36 of the leader pin 30 is pressed (held on) by the overhang portion 44, the removal (the departure) of the leader pin 30 from the holding portion 40 can be prevented.

When the recording tape cartridge 10 is out of use, i.e., when it is not loaded into the driving apparatus, since the notched portion 44A of the overhang portion 44 has a substantially U shape as seen from a plan view and can accommodate therein the portion of the main body portion 32 corresponding to the annular groove 35 of the leader pin 30, the flange portion 36 is always overlapped with the overhang portion 44 in a predetermined amount at the inner surface 36B side of the flange portion 36, further, the leader pin 30 is urged by the pair of the upper and lower engaging portions 45 in an axial direction (the direction in which the engaging portions 45 face each other) and held (held in a pressing manner). Therefore, inclination of the leader pin 37 can be prevented, and the removal (departing) thereof from the holding portions 40 can be prevented. Accordingly, inclination of the leader pin 37 can be prevented, use of urging members for pressing (holding on) the outer circumference surface 36C of the flange portion 36 such as springs as mentioned in the conventional art becomes unnecessary.

In other words, the engaging portion 45, having a substantially tongue shape as seen from a plan view, formed by the through hole 42 being formed at each of the top plate 14A of the upper case 14 and the bottom plate 16A of the lower case 16, is structured to be deformed elastically in a substantially axial direction of the leader pin 30 to allow the engaging portion 45 itself to have spring characteristics, and the engaging portions 45 hold the leader pin 30 to prevent the removal of the leader pin 30 from the holding portions 40. Therefore, the cost for manufacturing and assembling of the aforementioned urging member such as a spring can be deleted. Accordingly, the manufacturing cost of the recording tape cartridge 10 can be reduced as compared to that in the prior art.

Figure 8A:
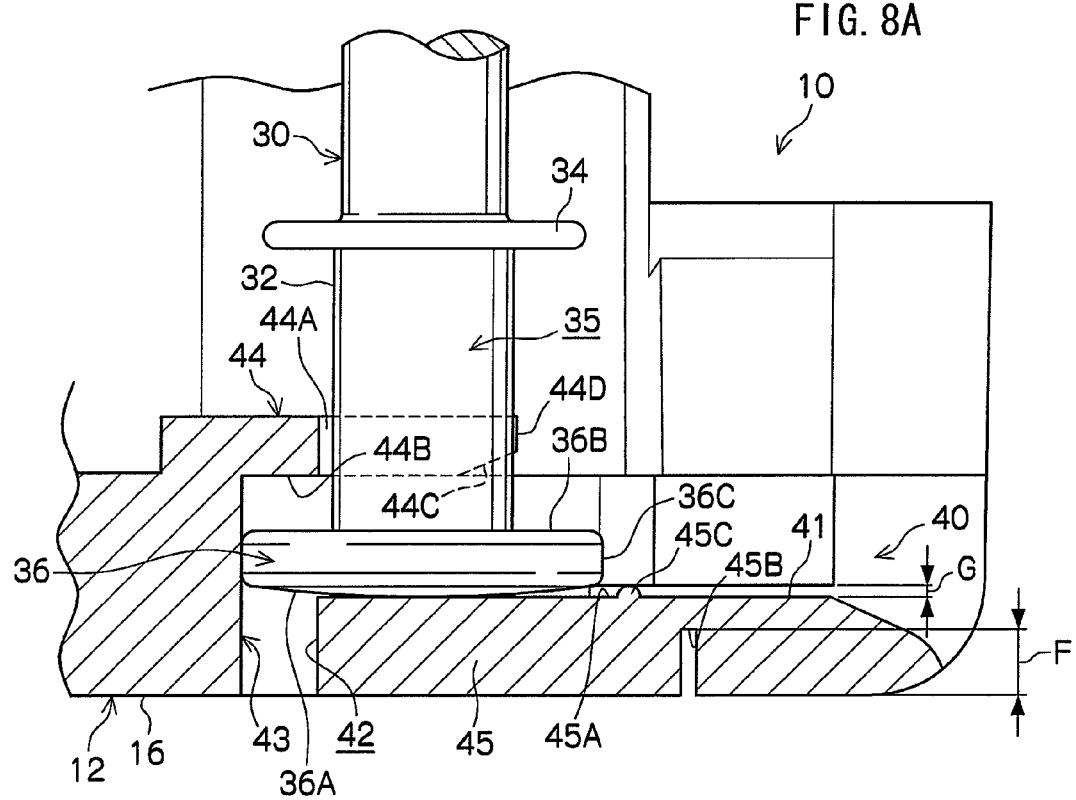
FIG. 8A is a schematic cross-sectional side view of a variant example showing the holding portion when the leader pin is held at the holding portion.
Figure 8B:
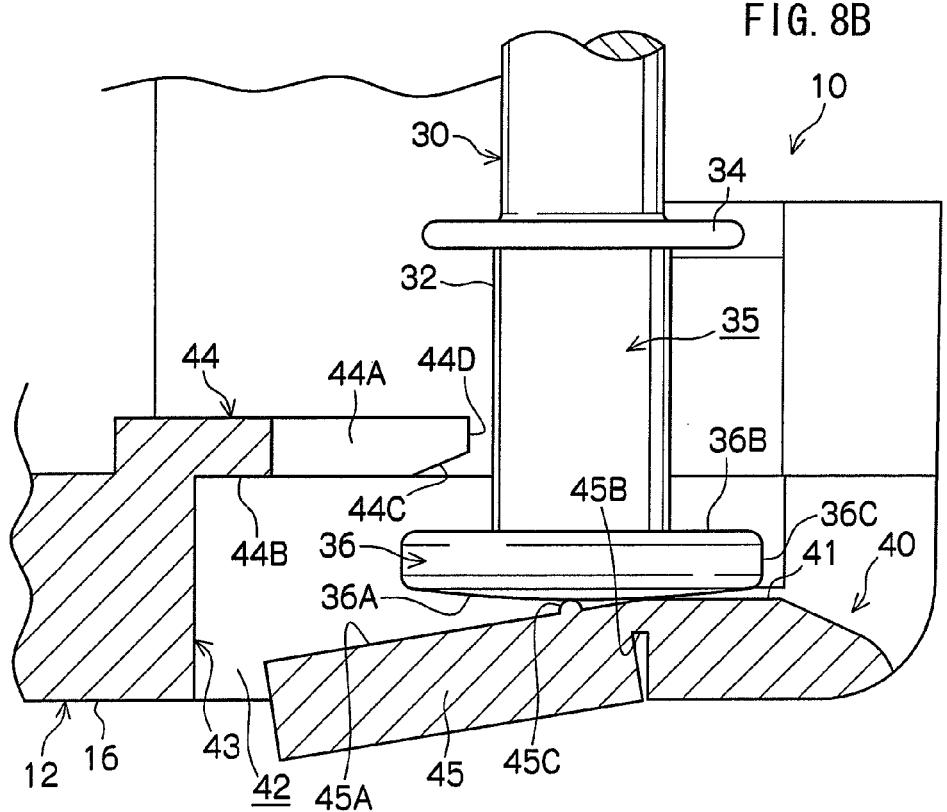
FIG. 8B is a schematic cross-sectional side view of the variant example showing the holding portion when the leader pin is detached or attached.

As shown in FIGS. 6A and 7B, since the protrusion 45C is positioned closer to the opening 18 (at an outer side) than the flange portion 36 of the leader pin 30 held at the holding portion 40 (engaging portion 45), when the recording tape cartridge 10 is out of use, the removal of the leader pin 30 from the holding portion 40 can be prevented by means of the protrusion 45C. Further, as shown in FIG. 8, the slit portions 45B may be formed respectively at an outer surface side of the top plate 14A of the upper case 14 and at an outer surface side of the bottom plate 16A of the lower case 16.

Figure 9:
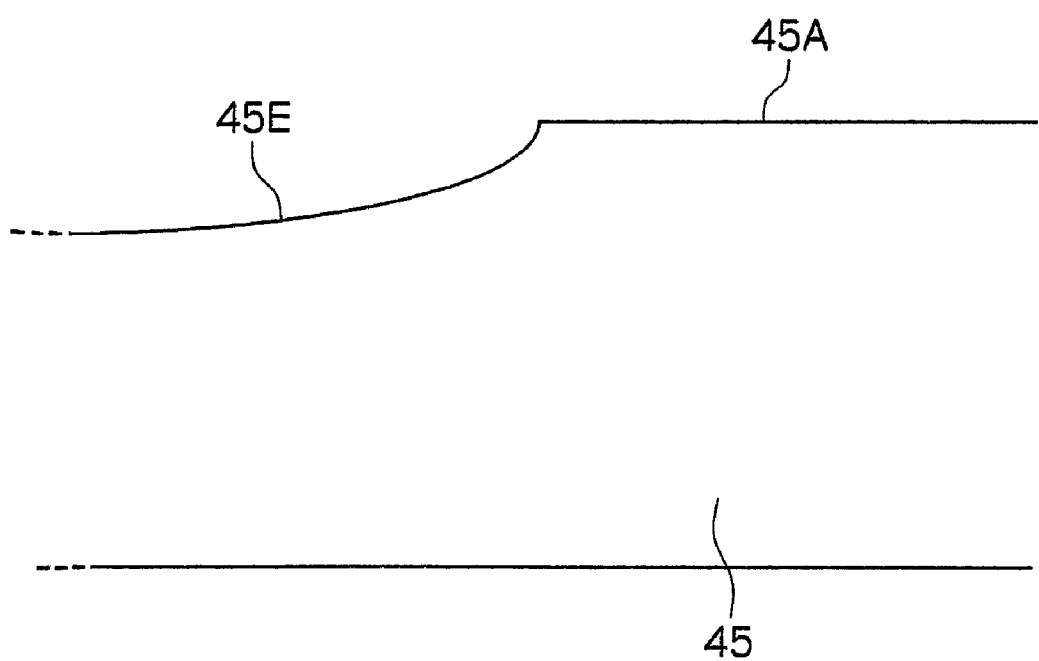
FIG. 9 is a schematic cross-sectional side view of a variant example showing a concave and curved surface formed on the engaging portion.

Further, a concave and curved surface 45E (see FIG. 9) having a small curvature (that is the same as the outer surface 36A of the flange portion 36) can be formed at the inner surface 45A of the engaging portion 45 to hold the outer surface 36A, which is formed as a convex and curved surface, of the flange portion 36. When the recording tape cartridge 10 is out of use, this structure can provide more excellent prevention of the removal of the leader pin 30 from the holding portions 40.

In the aforementioned embodiment, since the overhang portion 44 is formed so as not to form an undercut portion, it is not necessary to provide a movable core or a slide mechanism in a mold, so it is prevented that the structure of the mold is complicated. In other words, the mold structure can be simplified to prevent a drawback of increasing a manufacturing cost of the mold. Consequently, the vicinity of the holding portion 40 that may be a complicated configuration can be stable, so it is possible to prevent the occurrences of troubles.

The configuration of the overhang portion 44 (the notched portion 44A) is not limited to that shown in the drawings, and can be formed into any configuration to the extent that the overhang portion 44 can allow (accommodate therein) the portion of the main body portion 32 corresponding to the annular groove 35, and the flange portion 36 is overlapped with the overhang portion 44 in a predetermined amount at the inner surface 36B side of the flange portion 36 without being kept into contact therewith. Further, similarly, the configuration of the engaging portion 45 is not limited to that shown in the drawings. Moreover, it is desired that the overhang portion 44 and the engaging portion 45 are provided both at the upper case 14 and at the lower case 16. However, the overhang portion 44 and the engaging portion 45 can be provided at either one of the upper case 14 and the lower case 16.

The invention claimed is:

1. A recording tape cartridge, comprising:
   a case that includes an upper case and a lower case, and in which a single reel on which a recording tape is wound is accommodated;
   a leader pin that is attached, directly or through a leader tape, to an end portion of the recording tape, and includes flange portions formed at both ends thereof;
   an opening that is formed at the case, and from which the leader pin is pulled out;
   holding portions that are formed at the upper case and the lower case respectively, and hold respectively the flange portions of the leader pin in the vicinity of the opening;
   an overhang portion that is formed at at least one of the holding portions, and overlaps with the flange portion at an inner surface side thereof when the leader pin is held at the holding portions; and
   an elastic deformable engaging portion that is formed at at least one of the holding portions of the upper case and the lower case, said elastic deformable engaging portion configured by the same material of at least one of the upper case and the lower case at which said elastic deformable engaging portion is formed, and said elastic deformable engaging portion being formed out of a wall portion of at least one of the upper case or the lower case to urge the flange portion in an axial direction of the leader pin when the leader pin is held at the holding portions.

2. The recording tape cartridge according to claim 1, wherein a protrusion is formed at an inner surface of the engaging portion at a side of the opening with respect to the flange portion when the leader pin is held at the holding portions.

3. A recording tape cartridge, comprising:
   a case that includes an upper case and a lower case, and in which a single reel on which a recording tape is wound is accommodated;
   a leader pin that is attached, directly or through a leader tape, to an end portion of the recording tape, and includes flange portions formed at both ends thereof;
   an opening that is formed at the case, and from which the leader pin is pulled out;
   holding portions that are formed at the upper case and the lower case respectively, and hold respectively the flange portions of the leader pin in the vicinity of the opening;
   an overhang portion that is formed at at least one of the holding portions, and overlaps with the flange portion at an inner surface side thereof when the leader pin is held at the holding portions; and
   an elastic deformable engaging portion that is formed at at least one of the holding portions to urge the flange portion in an axial direction of the leader pin when the leader pin is held at the holding portions, wherein a slit portion having a predetermined depth is formed at an inner surface of the engaging portion.

4. The recording tape cartridge according to claim 3, wherein the engaging portion is elastically deformable such that the engaging portion is rotatable about the slit portion as a center in substantially the axial direction of the leader pin.

5. A recording tape cartridge, comprising:
   a case that includes an upper case and a lower case, and in which a single reel on which a recording tape is wound is accommodated;
   a leader pin that is attached, directly or through a leader tape, to an end portion of the recording tape, and includes flange portions formed at both ends thereof;
   an opening that is formed at the case, and from which the leader pin is pulled out;
   holding portions that are formed at the upper case and the lower case respectively, and hold respectively the flange portions of the leader pin in the vicinity of the opening;
   an overhang portion that is formed at at least one of the holding portions, and overlaps with the flange portion at an inner surface side thereof when the leader pin is held at the holding portions; and
   an elastic deformable engaging portion that is formed at at least one of the holding portions to urge the flange portion in an axial direction of the leader pin when the leader pin is held at the holding portions,
   wherein a protrusion is formed at an inner surface of the engaging portion at a side of the opening with respect to the flange portion when the leader pin is held at the holding portions, and
   a slit portion having a predetermined depth is formed at the inner surface of the engaging portion at a side of the opening with respect to the protrusion.

6. The recording tape cartridge according to claim 1, wherein a convex and curved surface is formed at the flange portion at an outer surface side thereof, and a concave and curved surface is formed at the engaging portion at an inner surface side thereof.

7. The recording tape cartridge according to claim 6, wherein curvature of the convex and curved surface of the flange portion is the same as that of the concave and curved surface of the engaging portion.

8. The recording tape cartridge of claim 1, comprising a plurality of the overhang portions and the engaging portions, wherein the overhang portions and the engaging portions are formed respectively at the holding portions.

9. The recording tape cartridge of claim 1, wherein the elastic deformable engaging portion urges the flange portion in the axial direction of the leader pin when the leader pin is attached to or detached from the holding portions.

* * * * *